United States Patent [19]

Cole, Jr.

[11] Patent Number: 4,823,325
[45] Date of Patent: Apr. 18, 1989

[54] STREAMER RETRIEVAL SYSTEM AND METHOD

[75] Inventor: Jim R. Cole, Jr., Katy, Tex.

[73] Assignee: Syntrieve, Inc., Houston, Tex.

[21] Appl. No.: 730,652

[22] Filed: May 6, 1985

Related U.S. Application Data

[63] Continuation-in-part of Ser. No. 588,713, Mar. 12, 1984, abandoned.

[51] Int. Cl.⁴ ............................ G01V 1/38; H01B 7/12
[52] U.S. Cl. .......................................... 367/20; 367/19; 114/245
[58] Field of Search ....................................... 367/16–20, 367/130, 106, 2–6; 441/2, 947, 93, 9, 10, 33, 92, 133; 114/244, 245, 52–54; 405/158, 173

[56] References Cited

U.S. PATENT DOCUMENTS

| | | | |
|---|---|---|---|
| 2,971,206 | 2/1961 | Linn | 441/7 |
| 3,041,021 | 6/1962 | Jaffe | |
| 3,077,944 | 2/1963 | Padberg, Jr. | 181/120 |
| 3,123,842 | 3/1964 | Deland, Jr. et al. | 441/9 |
| 3,706,294 | 12/1972 | Radford | |
| 3,794,965 | 2/1974 | Charske | |
| 4,229,809 | 10/1980 | Schwalbe | |
| 4,493,664 | 1/1985 | Dale | 441/7 |
| 4,541,079 | 9/1985 | Thigpen | 367/19 |

OTHER PUBLICATIONS

Advertising brochure of Subsalve USA, a division of Inflatable Technology Corp. of Providence, R.I.
Advertising brochure entitled "Surface Your Treasure" of J. W. Automarine.

Primary Examiner—Thomas H. Tarcza
Assistant Examiner—Daniel T. Pihulic
Attorney, Agent, or Firm—Arnold, White & Durkee

[57] ABSTRACT

A seismic streamer retrieval system utilizes an inflatable bag to lift the streamer to the water surface where it can easily be recovered. An acoustical signal or a pressure switch is used to activate said device so as to cause the inflatable bag to be ejected from said device and inflated to lift the streamer to the water surface. A small electric motor and drill bit are used to puncture a gas cylinder to release gas into the inflatable bag.

9 Claims, 4 Drawing Sheets

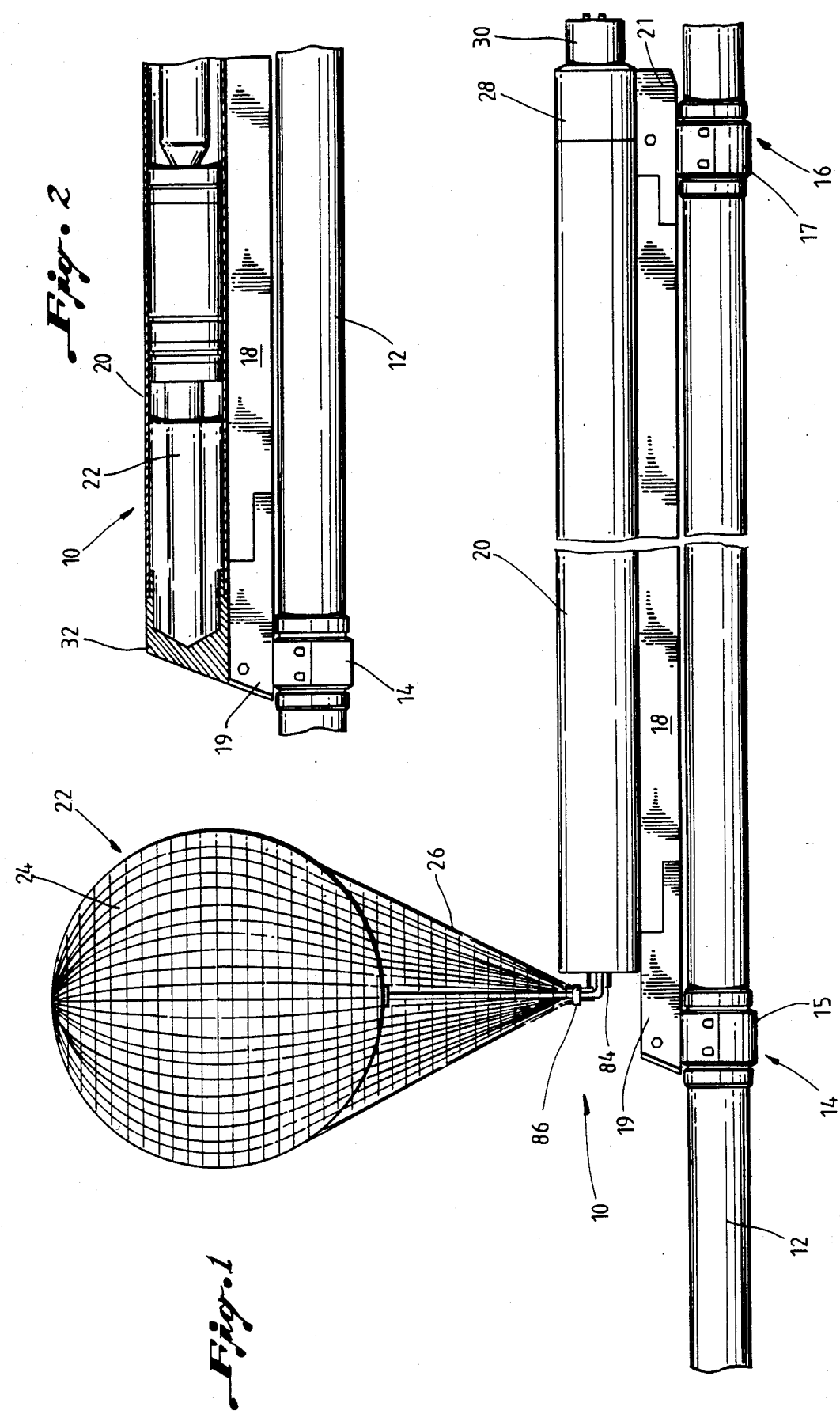

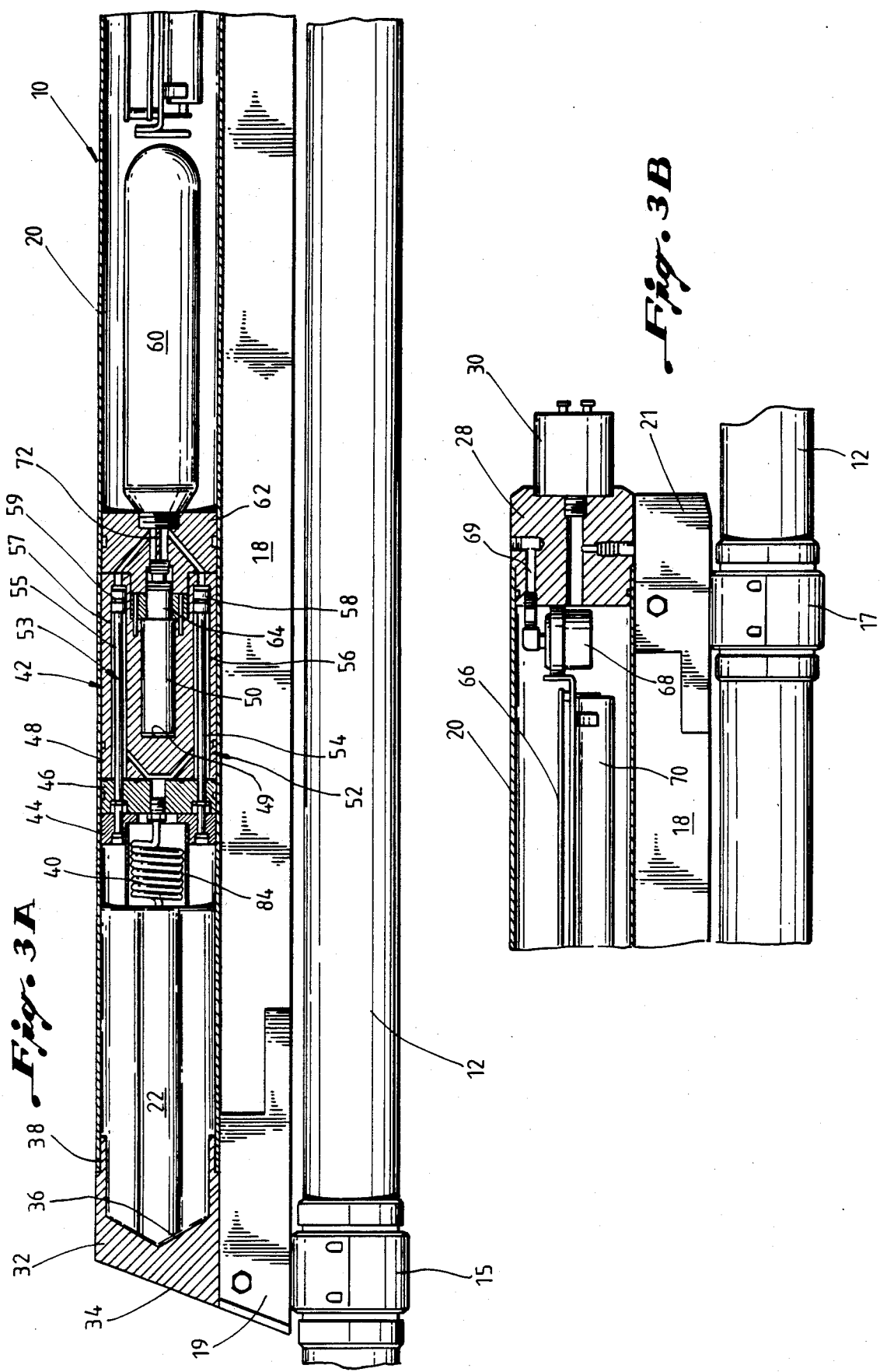

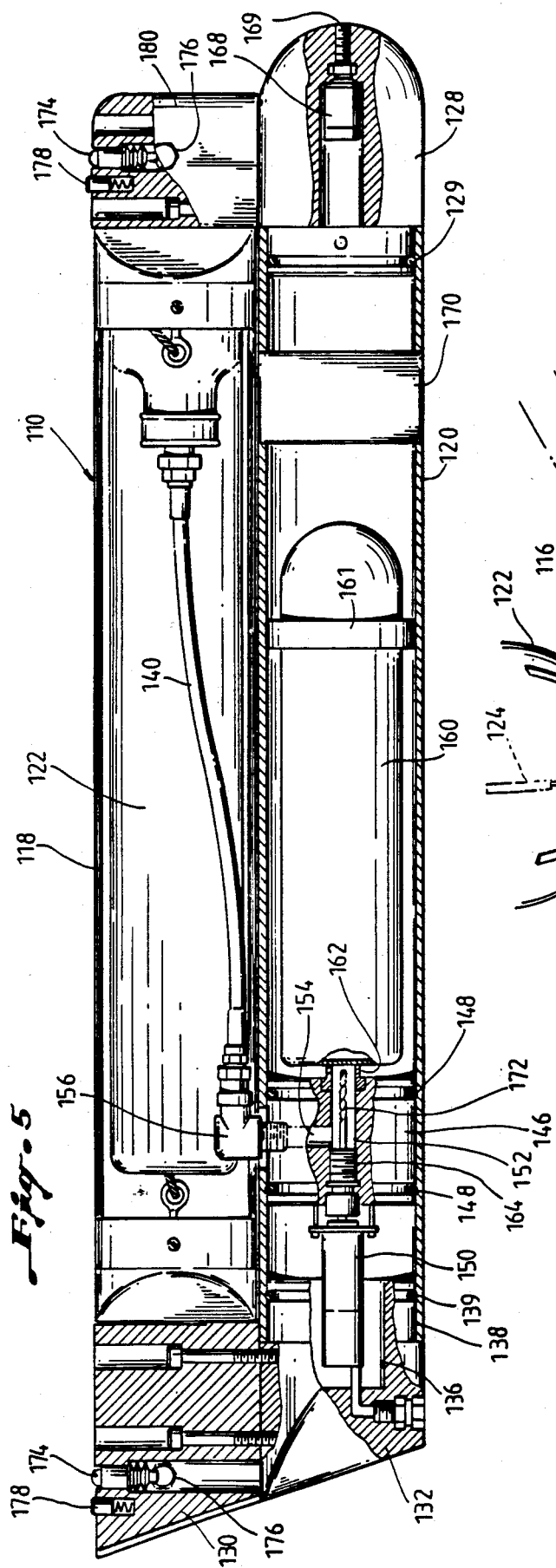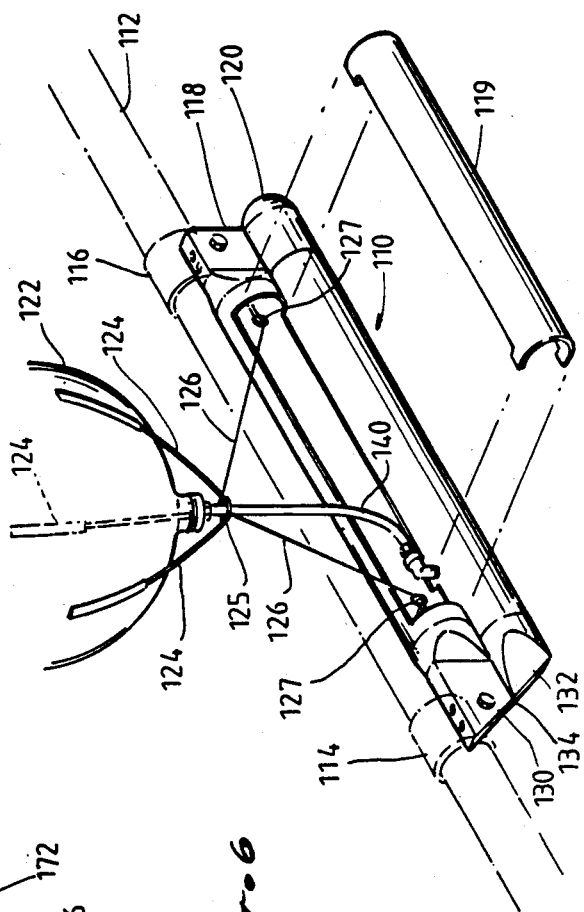

STREAMER RETRIEVAL SYSTEM AND METHOD

BACKGROUND

This application is a continuation-in-part of my co-pending application Ser. No. 588,713 filed Mar. 12, 1984.

The present invention relates to systems for locating and retrieving marine seismic streamers which become severed from the towing vessel. More particularly, the invention relates to floatable systems which lift marine streamers to the surface where they can be recovered.

Offshore data acquisition for well and gas exploration is generally collected by means of vessels which pull seismic streamers below the surface of the water. These marine seismic streamers are generally 3000 to 4000 meters in length and are towed at a depth of about 20 to 60 feet. The streamers include hundreds of hydrophones which detect seismic waves that are reflected from a shallow sound source, through the sub-bottom layers, and back up to the hydrophones. These waves are then transmitted to the towing vessel through the streamer where they can be processed to obtain information concerning underwater formations.

Remote controlled cable levelers are often attached to a streamer to keep the streamer level and to control its depth. These levelers include wings which can be adjusted to cause the streamer to rise or dive as it is pulled through the water. Generally 10 to 15 cable levelers are needed to maintain adequate control of the streamer.

Remote controlled compasses are also secured at various locations along the length of the streamer to provide a means for determining the position of the streamer. These compasses transmit heading data back to the seismic vessel where it can be utilized to calculate the position of the streamer.

The streamer, cable levelers, and compasses comprise expensive pieces of electronic equipment. The cost of a single streamer can be in the hundreds of thousands of dollars. Seismic streamers are frequently torn into pieces or are pulled entirely from the seismic vessel by obstructions in the water such as oil and gas rigs, crab pots, fishing lines, etc. Because of the high cost of the streamers, it is highly desirable to retrieve severed streamers so that they may be repaired and reused.

Seismic streamers are generally filled with a light oil to provide a neutral buoyancy along the length of the streamer. Accordingly, when a streamer is severed from the towing vessel, it does not readily rise to the surface nor sink to the bottom. Rather, the streamer gradually changes depth depending upon the salinity of the water and any currents. Thus, the momentum of the cable from being towed and ocean currents can carry the streamer for significant distances with its depth changing only gradually or in some circumstances changing significantly. Thus, it is extremely difficult to locate the position of a severed streamer.

The current procedures which are utilized to retrieve marine seismic streamers are generally unsatisfactory. While it is possible to put transmitters in a streamer to provide a means for locating the streamer once it is severed, it is still difficult to retrieve the streamer from the water. It is necessary for a diver to physically locate the streamer and to attach some type of cable or floatation device to bring the streamer to the surface.

In view of the foregoing it is apparent that it would be a significant advancement in the art to provide a system and method for retrieving seismic streamers which become severed from their towing vessels which could be remotely activated to cause the streamer to surface where it could more easily be retrieved. Such a system is disclosed and claimed herein.

BRIEF SUMMARY OF THE INVENTION

The present invention is directed to a retrieval system for seismic streamers which can be activated by remote control to cause the streamer to surface after it has been severed from the towing vessel. In the preferred embodiment, the retrieval system includes a plurality of retrieval devices which are connected to the streamer at intervals along its length. Each device includes a housing which contains an acoustical activation system, a source of compressed gas, and an inflatable floatation bag. When the system is activated, the floatation bag is ejected from the housing and is inflated to provide the buoyant force necessary to cause the streamer to surface.

In one preferred embodiment, the system is activated by an acoustic actuator signal transmitted from the towing vessel. If the actuator signal is faulty or if the retrieval system fails to activate, an automatic pressure switch in the retrieval system activates the retrieval system when the streamer reaches a predetermined depth.

The present invention also includes a method for recovering seismic streamers which have become severed from the towing vessel. The method includes providing a floatation device at intervals along the length of the streamer. When it is detected that a streamer has become severed, an activating signal is transmitted to deploy the floatation device which causes the streamer to surface where it can easily be recovered. Alternatively, the system is activated when the streamer reaches a predetermined depth.

BRIEF DESCRIPTION OF THE DRAWINGS

FIG. 1 is a perspective illustration of a portion of a seismic streamer including one embodiment of the retrieval system of the present invention in the deployed mode.

FIG. 2 is an illustration of the forward section of the retrieval system of FIG. 1 with the housing broken away to show the interior components.

FIGS. 3A and 3B are longitudinal cross-sectional views of a preferred embodiment of the retrieval system of the present invention.

FIG. 5 is a partial cross-sectional view of a second preferred embodiment of the present invention.

FIG. 6 is a perspective illustration of the embodiment of FIG. 5 in the deployed mode.

DETAILED DESCRIPTION OF THE PREFERRED EMBODIMENT

Figure 4:
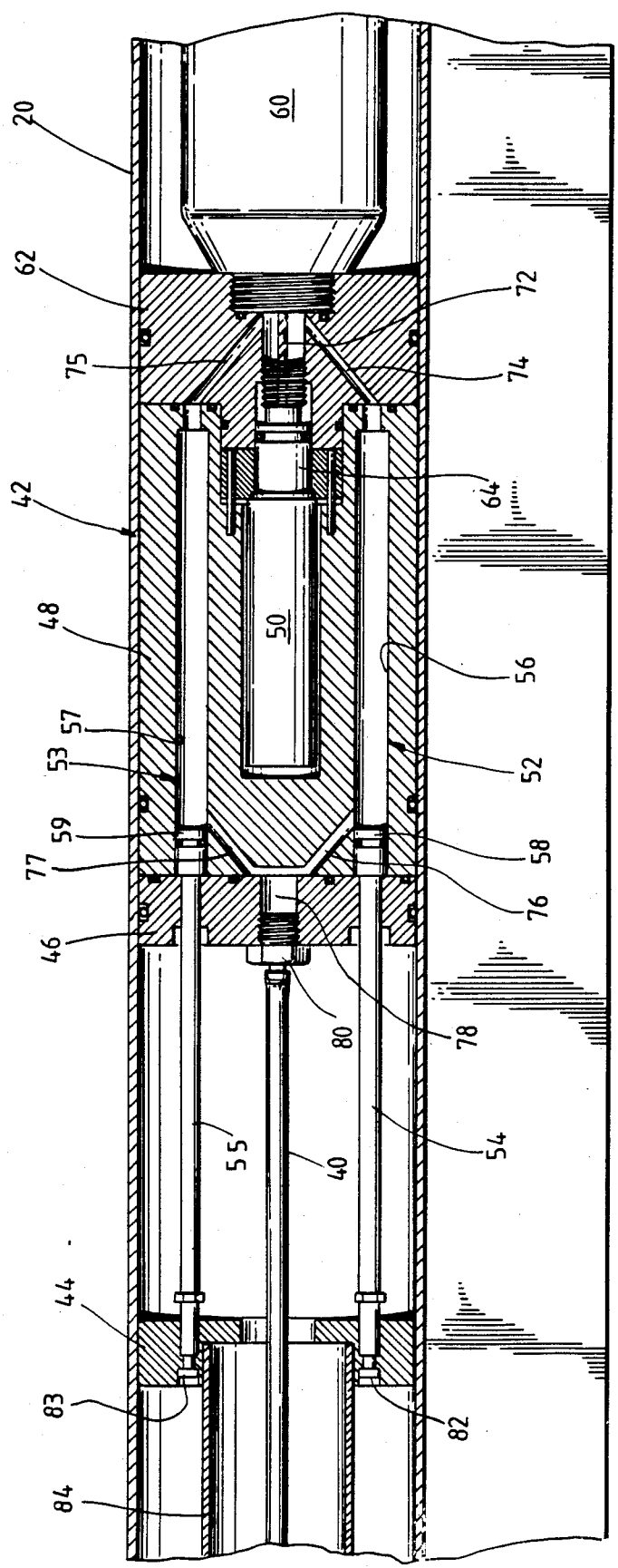
FIG. 4 is an enlarged cross-sectional view of the charging unit portion of the present invention illustrated in FIG. 3A.

The present invention provides novel retrieval apparatus and methods which can be used to recover a marine seismic streamer which is towed behind a vessel to acquire seismic data relating to subsurface formations. When it is detected that the streamer has become severed from the towing vessel, the retrieval apparatus, which is attached at intervals along the length of the streamer, can be activated by remote control to deploy a floatation device which causes the streamer to surface where it can be retrieved. In order to more fully describe the invention, reference is next made to the drawings in which like parts are designated with like numerals throughout.

FIG. 1 is a broken perspective view of a retriever apparatus 10 of the present invention illustrated in the deployed mode. The retriever 10 is attached to a seismic streamer 12 by a pair of collar assemblies 14 and 16. The retriever 10 includes a cylindrical body 20 which is coupled to collar assemblies 14 and 16. In a preferred embodiment a floatation bag 22 provides the buoyant force which causes the retriever 10 and streamer 12 to surface.

The collar assemblies 14 and 16 include outer races 15 and 17 which can rotate about assemblies 14 and 16. The race 15 is attached to a forward support shank 19, and the race 17 is attached to an aft support shank 21. The support shanks 19 and 21 can be attached to the races 14 and 16 by any suitable means such as a spring loaded dove-tail key in the support shank which fits into a dove-tail slot in the race. A support bar 18 extends from the support shank 19 to the support shank 21.

The races 15 and 17 allow the retriever apparatus 10 to rotate around streamer 12. While being towed, the apparatus 10 is generally below streamer 12. However, when apparatus 10 is deployed to raise the streamer, the floatation bag 22 causes apparatus 10 to rotate to the top of streamer 12, as illustrated in FIG. 1.

The body 20 of retriever 10 is generally cylindrical in shape and is secured to the support shanks 19 and 21. When the system is deployed, a nose piece 32 (see FIG. 2) is detached such that the floatation bag 22 can be ejected from the forward end of body 20. In this preferred embodiment, the floatation bag 22 is formed from a latex balloon 24 and a strong, lightweight nylon mesh cover 26 which couples the balloon 24 to retriever 10.

The amount of lift which the floatation bag 22 provides is dependent upon the depth of the device. In the preferred embodiment, floatation bag 22 has a diameter of about 28 inches when fully inflated at atmospheric pressure and about 72° F. Table 1 below shows how the size and thus, the floatation of the bag varies as it is submerged to greater depths.

TABLE 1

| Depth (Feet) | Pressure (Atmospheres) | Floatation (lbs) | Volume (Cubic in.) | Diameter (inches) |
| --- | --- | --- | --- | --- |
| 0 | 1 | 407 | 11,000 | 28.0 |
| 33 | 2 | 200 | 5,400 | 21.6 |
| 66 | 3 | 133 | 3,590 | 19.0 |
| 99 | 4 | 100 | 2,700 | 17.2 |
| 132 | 5 | 80 | 2,160 | 16.0 |
| 165 | 6 | 67 | 1,800 | 15.0 |
| 198 | 7 | 57 | 1,540 | 14.3 |
| 231 | 8 | 50.8 | 1,371 | 13.8 |

As can be seen with reference to Table 1, retriever apparatus 10 has a floatation of about 407 lbs at the surface. When the seismic streamer is submerged, the increased water pressure decreases the volume of the floatation bag 22 and thus, decreases the amount of floatation. For example, at a depth of about 200 feet, the floatation is only about 57 lbs.

As mentioned previously, seismic streamers are generally filled with a light oil so as to maintain a generally neutral buoyancy along their length. Generally, the streamers are divided into 50 meter sections which are sealed from and coupled to each other. Since there are usually not too many sections which are damaged, generally only a small amount of floatation is required to cause the streamer to surface. Accordingly, the preferred embodiment of the retriever apparatus of the present invention is generally attached to a seismic streamer at about 400 to 800 meter intervals.

In another preferred embodiment, floatation bag 22 is formed from a polyester fabric coated with PVC or polyurethane with a pressure relief valve inserted in the bag. With this embodiment, the floatation bag can be inflated to its full size at greater depths and pressure is released through the valve as the bag rises to keep it from rupturing.

Referring again to FIG. 1, tail piece section 28 is located in the aft end of body 20. A transducer 30 which receives signals to control retriever apparatus 10, is located in the tail piece section 28.

Reference is next made to FIGS. 3A and 3B which illustrate retriever apparatus 10 in a longitudinal cross-sectional view. With reference first to FIG. 3A, the nose piece 32 is positioned in the forward end of body 20 of apparatus 10. The forward outer surface 34 of nose piece 32 is tapered away from cable 12 so as to prevent lines, cables, or other objects coming in contact with apparatus 10 from becoming caught and damaging apparatus 10 or streamer 11. A recess 36 is formed in the interior of nose piece 32 and receives a portion of the floatation bag 22 when the apparatus is fully assembled. The rearward end of nose piece 32 is notched at 38 such that nose piece 32 can fit into the forward end of body 20 in press-fit relationship.

In the preferred embodiment, floatation bag 22 is rolled up during storage and is positioned behind nose piece 32 within housing 20. An eight-inch piece of vinyl tubing 40 connects the balloon 24 of the floatation bag 22 to a charging unit 42. The tubing 40 is coiled inside a collar 84 behind floatation bag 22 during storage.

The charging unit 42 is positioned within the center of housing 20 and includes a deployment ring 44 which is slidable within housing 20 and is used to force floatation bag 22 out of housing 20. Immediately behind the deployment ring 44 is a face seal assembly 46. The main portion of charging unit 42 is formed from a motor housing 48 which includes an interior cavity 49 into which a small electric motor 50 is positioned.

Located on opposite sides of the motor housing 48 are a pair of piston assemblies 52 and 53. The piston assemblies include piston rods 54 and 55 which are connected to pistons 58 and 59 respectively and are positioned within cylinders 56 and 57. As more fully discussed hereinafter, when the retriever apparatus 10 is activated, the piston assemblies 52 and 53 push the deployment ring 44 forward so as to eject floatation bag 22 from housing 20.

A motor housing end cap 62 is attached to the aft end of motor housing 48 and supports a carbon dioxide cylinder 60. The gas in cylinder 60 is used to push pistons 58 and 59 so as to eject floatation bag 22 and is then used to inflate balloon 24.

In the preferred embodiment, the carbon dioxide cylinder is a standard Ansul replacement cartridge for small fire extinguishers. The carbon dioxide is contained by a copper, frangible disk which must be punctured to release the gas. As more fully discussed hereinafter, motor 50 is attached to a motor coupling assembly 64 which drives a drill bit 72 to puncture the frangible disk to release the carbon dioxide.

Located behind the carbon dioxide cylinder 60 within housing 20 are the actuator controls for activating retriever apparatus 10. Referring now to FIG. 3B, the controls generally include a transponder 66, a pressure switch 68, a transducer 30 and a power supply 70. In one preferred embodiment, the power supply 70 provides twelve volts and contains eight "C" sized batteries.

Various types of acoustical transducers can be used in the present invention. For example, in the preferred embodiment transducer 30 is a Datasonics model AT-477 transducer. Transponder 66 is an underwater acoustical transponder such as the Datasonics model UAT-377 transponder which is modified to receive a coded signal as more fully discussed hereinafter.

The retrieval system also includes a shipboard unit for communicating with the retriever apparatus which includes an interrogation transducer such as a Datasonics model AT-477 transducer. The interrogation transducer is connected to a depressor and 300 feet of cord such as Kevlar cable such that the transducer can be deployed in the water behind the vessel. The depressor can be towed at five knots diving to between 70 and 100 feet. The Kevlar cable is connected to an acoustic ranging transceiver such as a Datasonics model ART-277 acoustic ranging transceiver which is aboard the towing vessel and which is modified to transmit a coded signal upon direction.

The shipboard unit periodically transmits acoustic search pulses via the AT-477 interrogation transducer to the retriever apparatus 10 where the transducer 30 receives the pulse and transmits it to the transponder 66. When the search pulse is properly decoded by the transponder 66, a return pulse is transmitted back to the acoustic transceiver on the ship. A processor in the ART-277 the ship converts the amount of time necessary for the transmit-receive cycle of these pulses into range which can be displayed on the front panel of the transceiver. Thus, the distance or depth of the streamer from the ship can be determined. The ART-277 transceiver can interrogate several transponders simultaneously which allows the monitoring of several retriever apparatus at the same time. Under suitable conditions, communications can be achieved up to a distance of about 3.5 miles using this system.

Should it be necessary to activate the retriever apparatus to cause the streamer to surface, an actuator signal is transmitted to the transducer 30 and transponder 66. In the illustrated embodiment, the actuator signal takes the form of a coded signal which upon decoding activates charging unit 42 by directing power to the motor 50 as more fully described hereinafter. In order to prevent accidental activation of the retriever apparatus by signals from other vessels, the transceiver and transponder are designed to send and receive a specially coded signal. The shipboard electronics for generating the search pulses and the coded actuator signal, and the circuitry in the retrieval system for generating the return pulse can be generated by standard techniques using conventional circuitry.

It will be appreciated by those skilled in the art that many other types of transmitting and receiving devices can be used in the present invention similar to the system described.

If for some reason the transducer and transponder fail to operate and the streamer begins to sink to the ocean floor, the pressure switch 68 which is preset to activate the retriever apparatus when it reaches a predetermined depth, can activate the apparatus. In the preferred embodiment, the pressure switch 68 is set to activate when the apparatus reaches a depth of about 150 feet. The pressure switch 68 is connected by a conduit 69 which leads to the exterior of the tail piece section 28 where it is in communication with the surrounding water.

Reference is next made to FIG. 4 to describe the method whereby the floatation bag 22 is deployed after the transponder 66 receives the activating signal.

When the charging unit 42 is activated by transponder 66, power from the power supply 70 is directed to the motor 50 which is a high torque planetary gear motor. The motor immediately begins turning and drives the motor coupling assembly 64 into which a drill bit 72 has been inserted. The coupling assembly 64 moves forward causing the drill bit to pass through the frangible disk in the carbon dioxide cylinder 60. A timing circuit prepared using standard techniques and conventional circuitry is added to transponder 66 so that the motor 50 runs for only 20 seconds to avoid having coupler 64 bottom out on top of cylinder 60. The use of the motor and drill to release the gas from the cylinder is unique in that it decreases the possibility that the gas can leak out of the cylinder before use.

After the disk has been punctured, the carbon dioxide escapes from cylinder 60 and passes through a pair of primary exhaust ports 74 and 75 such that it can enter piston cylinders 56 and 57. As the gas pushes on the pistons 58 and 59 it causes them to slide forward within cylinders 56 and 57.

The pistons 58 and 59 are connected to deployment ring 44 by piston rods 54 and 55 which are secured thereto by a pair of screws 82 and 83. Thus, as pistons 58 and 59 move forward, they cause the deployment ring 44 to slide forward within housing 20 which pushes the floatation bag 22 out of the front end of body 20.

When pistons 58 and 59 reach their full stroke they are stopped by the face seal assembly 46. The carbon dioxide can then pass through a pair of secondary exhaust ports 76 and 77. The exhaust ports 76 and 77 are connected to a bore 78 in the face seal assembly 46 into which an NPT fitting 80 is threaded. The vinyl tubing 40 is connected to fitting 80 on one end and is connected to the balloon 24 (see FIG. 1) at the other end. Accordingly, after pistons 58 and 59 have reached their full stroke, the carbon dioxide can pass from charging unit 42 through tubing 40 and into the floatation bag 22. At this point in time, the floatation bag 22 is outside body 20 where it can inflate unrestricted.

The cylindrical collar 84 which is attached to the forward end of deployment ring 44 assists in forcing floatation bag 22 out of body 20. Additionally, the end of collar 84 is hinged so that it can bend to substantially form a 90° angle after the floatation bag begins to inflate (see FIG. 1). Thus, the tubing 40 which passes through the center of collar 84 is shielded against being pinched off as floatation bag 22 begins to inflate and pull the tubing upward. Additionally, the nylon mesh cover 26 which surrounds balloon 24 is secured to the forward end of collar 84 by a clamp 86. Accordingly, the buoyant force of balloon 24 is transferred to receiver assembly 10 through the mesh cover 26 and collar 84.

When floatation bag 22 is inflated, it causes streamer 12 to surface where it can readily be retrieved for repair and reuse. Additionally, retriever apparatus 10 can be repacked and reused after the carbon dioxide cylinder 60 is replaced.

Reference is next made to FIGS. 5 and 6 which illustrate a second preferred embodiment of the present invention. The retriever apparatus is generally represented at 110 and is attached at periodic intervals to a seismic streamer 112. Collar assemblies 114 and 116 are attached to streamer 112 to secure retriever apparatus 110.

Retriever apparatus 110 includes an upper body member 118 and a lower body member 120. Upper body member 118 contains floatation bag 122 which is ejected after door assembly 119 is removed. In operation, as floatation bag 122 begins to inflate it pushes against door assembly 119 causing it to fall it away from upper body member 18 such that floatation bag 122 can escape and inflate.

As can be seen with reference to FIG. 6, three straps 124 are connected equidistantly around the lower portion of floatation bag 122. The lower ends of straps 124 are connected to a ring 125. Cables 126 connect ring 125 to eyelets 127 in upper body member 118. Thus, as floatation bag 122 is inflated and begins to rise, the force is transmitted through straps 124 and cables 126 to cause the retriever apparatus 110 and streamer 112 to rise to the surface.

Lower body member 120 includes a tailpiece 128 which is sealingly fitted in the aft portion of body member 120. An O-ring 129 seals tailpiece 128 to body member 120. In the embodiment illustrated in FIG. 5, tailpiece 128 includes a pressure switch 168 which is designed to activate retriever apparatus 110 if the streamer and retriever apparatus reach a predetermined depth. Pressure switch 168 is connected by way of conduit 169 to the water surrounding apparatus 110 such that it can sense the water pressure.

When retriever apparatus 110 reaches a predetermined depth, pressure switch 168 activates power supply 170 which initiates the recovery system. Located in the forward end of body member 120 is a nosepiece 132 which includes a recess 136 formed therein. Nosepiece 132 is notched at 138 such that it can fit within body member 120 and is sealingly engaged therewith by O-ring 139.

Positioned within recess 136 of nosepiece 132 is an electric motor 150. Power supply 170 drives motor 150 to activate the system. Motor 150 is connected through a motorcoupling assembly 164 to a drill bit 172. Motor coupling assembly 164 and drill bit 172 are positioned within a central bore 152 of a primary exhaust manifold 146.

Exhaust manifold 146 is sealed within lower body member 120 by O-rings 148. A carbon dioxide cylinder 160 is attached to exhaust manifold 146 by neck 162. As motor 150 operates, drill bit 172 punctures a frangible disk in cylinder 160 causing the gas to escape. The gas travels through bore 152 and up through exhaust port 154 in exhaust manifold 146.

An elbow 156 is threaded in the top of exhaust port 154 and is connected to tubing 140 which is connected at its other end to floatation bag 122. Accordingly, when pressure switch 168 senses that the apparatus 110 has reached a predetermined depth, it activates power supply 170 which drives motor 150 to cause drill bit 172 to puncture the disk in cylinder 176. The gas is then released and causes floatation bag 122 to force door assembly 119 off of upper body member 118 such that the floatation bag 122 can escape and be inflated.

With reference to FIG. 5, the means for attaching retriever apparatus 110 to collar assemblies 114 and 116 is illustrated. A nosepiece 130 is positioned in the front of upper body member 118 and includes a latch pin 174 and a safety pin 178. These are designed to correspond with a key slot in collar assembly 114. A cam 176 is used to raise latch pin 174 such that it can be inserted into the key slot.

Tailpiece 180, which is located in the aft end of upper body member 118, also includes a latch pin 174, a safety pin 178 and a cam 176 for securing tailpiece 180 to collar assembly 116.

While retriever apparatus 110 has been illustrated utilizing a pressure switch to activate the recovery system, it will be appreciated that other activation means such as the transponder system of apparatus 10 could also be included in this embodiment.

As can be seen from the foregoing, the present invention provides a unique and reliable method for retrieving seismic streamers which have become severed from their towing vessel. While the invention has been described with reference to the presently preferred embodiments as illustrated in FIGS. 1 to 6, it will be readily appreciated by those skilled in the art that the invention may be embodied in other specific forms without departing from its spirit or essential characteristics. Accordingly, the scope of the invention is defined by the appended claims rather than by the foregoing description. All changes or modifications which come within the meaning and range of equivalency of the claims are to be embraced within their scope.

I claim:

1. A retrieval system for a seismic streamer comprising:
   a flotation device which can be coupled to said seismic streamer, wherein said flotation device can be activated to eject and inflate a flotation bag to cause the streamer to surface, said flotation device comprising a source of compressed gas contained in a cylinder and a rotary motor and a drill capable of puncturing said cylinder for releasing said gas from said cylinder; and
   an actuator which can be activated from a signal generated at a location which is remote to the retrieval system to cause the streamer to surface.

2. A retrieval system for a seismic streamer as defined in claim 1 wherein said actuator comprises an acoustic transducer and an underwater acoustic transponder which are coupled to said floatation device.

3. A retrieval system for a seismic streamer as defined in claim 2 further comprising a shipboard interrogation transducer and an acoustic ranging transceiver for transmitting a signal to said actuator.

4. A retrieval system for a seismic streamer as defined in claim 1 wherein said floatation bag is contained within an elongated body, said system further comprising means for ejecting said bag from an end of said body.

5. A retrieval system for a seismic streamer as defined in claim 4 wherein said ejecting means comprises a gas powered piston which pushes said floatation bag out an end of said elongated body.

6. A retrieval system for a seismic streamer as defined in claim 1 wherein said floatation bag is contained within an elongated body, said system further comprising means for ejecting said bag from a side of said body.

7. A retrieval system for a seismic streamer as defined in claim 6 wherein said body has a detachable side which is detached as said floatation bag begins to inflate and push against said side.

8. A retrieval system for a seismic streamer as defined in claim 1 further comprising a pressure switch for automatically activating said floatation device if said streamer reaches a predetermined depth.

9. A retrieval system for a seismic streamer comprising:

an elongated body which can be coupled to a streamer, said body including;

a floatation bag connected to said body, said bag being stored within said body when not inflated;

a cylinder of compressed gas for inflating said bag;

a rotary motor and drill assembly for puncturing an end of said cylinder to release said compressed gas; and an actuator for causing said motor to operate when a given signal is received.

* * * * *